US011956718B2

(12) United States Patent
Song et al.

(10) Patent No.: US 11,956,718 B2
(45) Date of Patent: Apr. 9, 2024

(54) METHOD AND APPARATUS FOR DEDICATED CORE NETWORK SELECTION

(71) Applicant: Telefonaktiebolaget LM Ericsson (publ), Stockholm (SE)

(72) Inventors: Qiong Song, Shanghai (CN); Xiaoming Li, Shanghai (CN); Lu Wang, Shanghai (CN)

(73) Assignee: Telefonaktiebolaget LM Ericsson, Stockholm (SE)

( * ) Notice: Subject to any disclaimer, the term of this patent is extended or adjusted under 35 U.S.C. 154(b) by 164 days.

(21) Appl. No.: 17/423,479

(22) PCT Filed: Jan. 16, 2019

(86) PCT No.: PCT/CN2019/071999
§ 371 (c)(1),
(2) Date: Jul. 16, 2021

(87) PCT Pub. No.: WO2020/147038
PCT Pub. Date: Jul. 23, 2020

(65) Prior Publication Data
US 2022/0116867 A1    Apr. 14, 2022

(51) Int. Cl.
*H04W 48/20* (2009.01)
*H04W 60/04* (2009.01)
*H04W 76/20* (2018.01)

(52) U.S. Cl.
CPC ........... *H04W 48/20* (2013.01); *H04W 60/04* (2013.01); *H04W 76/20* (2018.02)

(58) Field of Classification Search
CPC .................... H04W 24/10; H04W 56/001

USPC .......................................... 370/331
See application file for complete search history.

(56) References Cited

U.S. PATENT DOCUMENTS

| 2016/0227514 | A1* | 8/2016 | Burbidge .............. H04W 68/08 |
| 2017/0086165 | A1  | 3/2017 | Tarradell et al. |
| 2018/0103426 | A1  | 4/2018 | Nacer et al. |
| 2018/0317165 | A1* | 11/2018 | Krishnamoorthy .......... H04W 52/0219 |

(Continued)

FOREIGN PATENT DOCUMENTS

| CN | 107592974 A | 1/2018 |
| CN | 108353353 A | 7/2018 |

(Continued)

OTHER PUBLICATIONS

International Search Report and Written Opinion for Application No. PCT/CN2019/071999, dated Oct. 14, 2019, 9 pages.

(Continued)

*Primary Examiner* — Kiet M Doan
(74) *Attorney, Agent, or Firm* — Nicholson De Vos Webster & Elliott LLP

(57) ABSTRACT

A method for selection of a core network. The method which can be performed by a first network node comprises receiving a message for a terminal device from a second network node. The message can enable the first network node to determine a category of the terminal device. The method further comprises selecting a core network for the terminal device based at least in part on the category of the terminal device. The terminal device can be served by a dedicated core network selected for the terminal device adaptively, so that network configuration and resource efficiency can be improved.

10 Claims, 7 Drawing Sheets

(56) References Cited

U.S. PATENT DOCUMENTS

| | | | |
|---|---|---|---|
| 2018/0324564 A1 | 11/2018 | Feng | |
| 2018/0324748 A1 | 11/2018 | Nord et al. | |
| 2018/0324761 A1 | 11/2018 | Velev et al. | |
| 2019/0028887 A1 | 1/2019 | Ryu et al. | |

FOREIGN PATENT DOCUMENTS

| | | | |
|---|---|---|---|
| EP | 3399830 A1 | 11/2018 | |
| JP | 2017-147518 A | 8/2017 | |
| JP | 2018-534867 A | 11/2018 | |
| KR | 10-2016-0147979 A | 12/2016 | |
| KR | 10-2018-0084836 A | 7/2018 | |
| KR | 10-2018-0088482 A | 8/2018 | |
| KR | 10-2018-0103822 A | 9/2018 | |
| WO | 2017081864 A1 | 5/2017 | |
| WO | 2018069115 A1 | 4/2018 | |

OTHER PUBLICATIONS

3GPP TS 23.401 V16.1.0, "3rd Generation Partnership Project; Technical Specification Group Services and System Aspects; General Packet Radio Service (GPRS) enhancements for Evolved Universal Terrestrial Radio Access Network (E-UTRAN) access (Release 16)," Dec. 2018, 411 pages, 3GPP Organizational Partners.
3GPP TS 36.300 V15.3.0, "3rd Generation Partnership Project; Technical Specification Group Radio Access Network; Evolved Universal Terrestrial Radio Access (E-UTRA) and Evolved Universal Terrestrial Radio Access Network (E- Utran); Overall description; Stage 2 (Release 15)," Sep. 2018, 358 pages, 3GPP Organizational Partners.
3GPP TS 36.306 V15.2.0, "3rd Generation Partnership Project; Technical Specification Group Radio Access Network; Evolved Universal Terrestrial Radio Access (E-UTRA); User Equipment (UE) radio access capabilities (Release 15)," Sep. 2018, 109 pages, 3GPP Organizational Partners.
3GPP TS 36.413 V15.3.0, "3rd Generation Partnership Project; Technical Specification Group Radio Access Network; Evolved Universal Terrestrial Radio Access Network (E-UTRAN); S1 Application Protocol (S1AP) (Release 15)," Sep. 2018, 383 pages, 3GPP Organizational Partners.
Huawei, "Discussion on CE Mode B support Indicator," Aug. 22-26, 2016, 5 pages, 3GPP TSG-RAN3 Meeting #93, R3-161637, Gothenburg, Sweden.
Ericsson, "eDECOR Defintions," Jan. 25-29, 2016, 2 pages, SA WG2 Meeting #113, S2-160151, Saint Kitts, KN.
Huawei et al., "DNS enhancement for supporting DCN Type," Apr. 11-15, 2016, 4 pages, SA WG2 Meeting #114, S2-161706, Sophia-Antipolis, France.
Ericsson, "Selection of PDN GW in a roaming scenario," Jan. 16-20, 2017, 5 pages, SA WG2 Meeting #118BIS, S2-170133, Spokane, WA.
International Preliminary Report on Patentability, PCT App. No. PCT/CN2019/071999, Jul. 29, 2021, 5 pages.
Nokia et al., "Introduction of Restricted Local Operator Services", Jan. 21-25, 2019, 7 pages, SA WG2 Meeting #130, S2-1900227 (revision of S2-190xxxx), Kochi, India.
Office Action, KR App. No. 10-2021-7025838, Aug. 5, 2022, 13 pages (7 pages of English Translation and 6 pages of Original Document).
Supplementary European Search Report and Search Opinion, EP App. No. 19910335.9, Jul. 22, 2022, 17 pages.
3GPP TS 23.401 V15.3.0, "3rd Generation Partnership Project; Technical Specification Group Services and System Aspects; General Packet Radio Service (GPRS) enhancements for Evolved Universal Terrestrial Radio Access Network (E-UTRAN) access (Release 15)," Mar. 2018, 405 pages, 3GPP Organizational Partners.
First Office Action, CN App. No. 201980089476.8, Jun. 3, 2023, 12 pages (3 pages of English Translation and 9 pages of Original Document).
Qualcomm et al., "Identification of LTE-M (eMTC) traffic," May 28-Jun. 1, 2018, 73 pages, 3GPP TSG-SA2 Meeting #127bis, S2-185714, Newport Beach, USA.
Written Decision on Registration, KR App. No. 10-2021-7025838, Jun. 16, 2023, 6 pages (3 pages of English Translation and 3 pages of Original Document).
Second Office Action, CN App. No. 201980089476.8, dated Dec. 23, 2023, 20 pages (12 pages of English translation and 8 pages of Original Document).

\* cited by examiner

METHOD AND APPARATUS FOR DEDICATED CORE NETWORK SELECTION

CROSS-REFERENCE TO RELATED APPLICATIONS

This application is a National stage of International Application No. PCT/CN2019/071999, filed Jan. 16, 2019, which is hereby incorporated by reference.

FIELD OF THE INVENTION

The present disclosure generally relates to communication networks, and more specifically, to core network selection in a communication network.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks such as long-term evolution (LTE)/fourth generation (4G) network and new radio (NR)/fifth generation (5G) network are expected to achieve high traffic capacity and end-user data rate with lower latency. To meet the diverse requirements of new services across a wide variety of industries, the 3rd generation partnership project (3GPP) is developing the core network architecture with a dedicated core (DECOR) function. A network operator may choose to deploy one or more dedicated core networks (DCNs) within a public land mobile network (PLMN) with each core network dedicated for a group of specific subscribers. In this case, it is desirable to enable a subscriber to be served by a proper DCN in a more efficient way.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The ongoing 3GPP activity aims to reform the core network architecture for the next generation network, including introduction of the DECOR function to support the wide range of performance requirements demanded by new business opportunities, multiple access technologies, a variety of services and new device types. The DECOR function mainly uses user equipment usage type (UUT) to select DCNs. UUT is subscription information associated with an international mobile subscriber identity (IMSI) in a home subscriber server (HSS). However, a subscriber may insert a universal subscriber identity module (USIM) with the IMSI to different types of terminal devices which may have different radio capabilities. In this case, using UUT to select the DCN for the subscriber may become less effective, because the network services provided to the subscriber are also influenced by the capabilities of the terminal devices, in addition to the subscription information. Therefore, it may be desirable to improve DCN selection for different types of devices.

Various embodiments of the present disclosure propose a solution of DCN selection in a communication network, which can enable a subscriber to be allocated to a DCN based at least in part on a category of a terminal device used by the subscriber, so that the subscriber can be served by the allocated DCN with improved resource utilization.

According to a first aspect of the present disclosure, there is provided a method performed by a first network node such as a mobility management entity (MME), an access and mobility management function (AMF), or any other suitable network function/entity which is able to select a core network for a terminal device. The method comprises receiving a message for a terminal device from a second network node (such as a radio access network (RAN) node). The message enables the first network node to determine a category of the terminal device (such as a category-M user equipment (CAT-M UE) or other types of devices). The method further comprises selecting a core network for the terminal device based at least in part on the category of the terminal device.

In accordance with an exemplary embodiment, the category of the terminal device may be indicated by a category indicator which is provided by the second network node in the message for the terminal device.

Alternatively or additionally, the category of the terminal device may be indicated by a category indicator which is provided by the terminal device in a communication request carried by the message for the terminal device.

In accordance with an exemplary embodiment, the message for the terminal device may comprise an initial UE message or any other suitable message communicated between the first network node and the second network node.

In accordance with an exemplary embodiment, the communication request initiated by the terminal device may comprise an attach request, a tracking area update (TAU) request or any other suitable non-access stratum (NAS) request for the terminal device.

In accordance with an exemplary embodiment, the selection of the core network for the terminal device based at least in part on the category of the terminal device may comprise selecting the core network for the terminal device, based at least in part on the category of the terminal device and usage type information associated with the terminal device.

According to a second aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus. The apparatus may comprise a receiving unit and a selecting unit. In accordance with some exemplary embodiments, the receiving unit may be operable to carry out at least the receiving step of the method according to the first aspect of the present disclosure. The selecting unit may be operable to carry out at least the selecting step of the method according to the first aspect of the present disclosure.

According to a fifth aspect of the present disclosure, there is provided a method performed by a second network node such as a node B (e.g., an evolved node B (eNB) or a next generation node B (gNB)), an access point (AP), or any other suitable RAN node. The method comprises transmitting a message for a terminal device to a first network node (such as an MME/AMF). The message can enable the first network node to select, based at least in part on a category of the terminal device, a core network for the terminal device.

Optionally, the method according to the fifth aspect of the present disclosure may further comprise: providing, by the second network node, a category indicator in the message for the terminal device to indicate the category of the terminal device to the first network node.

Alternatively or additionally, the message for the terminal device may carry a communication request in which a category indicator is provided by the terminal device to indicate the category of the terminal device.

In accordance with an exemplary embodiment, the message for the terminal device may comprise an initial UE message, and the communication request may comprise one of an attach request and a TAU request for the terminal device.

Optionally, the selection of the core network for the terminal device performed by the first network node may be based at least in part on the category of the terminal device and usage type information associated with the terminal device.

According to a sixth aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus. The apparatus may comprise a transmitting unit and optionally a providing unit. In accordance with some exemplary embodiments, the transmitting unit may be operable to carry out at least the transmitting step of the method according to the fifth aspect of the present disclosure. The providing unit may be operable to carry out at least the providing step of the method according to the fifth aspect of the present disclosure.

According to a ninth aspect of the present disclosure, there is provided a method performed by a terminal device such as UE (e.g., category M1 UE, category M2 UE, or other types of UEs for which the proposed solution is applicable). The method comprises providing a category indicator in a communication request to indicate a category of the terminal device. The method further comprises transmitting the communication request to a second network node (such as an eNB/gNB). In accordance with an exemplary embodiment, the communication request may be carried in a message transmitted from the second network node to a first network node (such as an MME/AMF). The message can enable the first network node to select, based at least in part on the category of the terminal device, a core network for the terminal device.

In accordance with an exemplary embodiment, the selection of the core network for the terminal device performed by the first network node may be further based on usage type information associated with the terminal device.

In accordance with an exemplary embodiment, the category indicator may be included in an information element (IE) about network capability of the terminal device. Optionally, the IE about the network capability of the terminal device may comprise an IE in the communication request initiated by the terminal device, such as the UE network capability IE.

In accordance with an exemplary embodiment, the communication request may comprise an attach request, a TAU request or any other proper request for the terminal device. Optionally, the communication request may be forwarded to the first network node by the second network node in an initial UE message.

According to a tenth aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the ninth aspect of the present disclosure.

According to an eleventh aspect of the present disclosure, there is provided a computer-readable medium having computer program codes embodied thereon which, when executed on a computer, cause the computer to perform any step of the method according to the ninth aspect of the present disclosure.

According to a twelfth aspect of the present disclosure, there is provided an apparatus. The apparatus may comprise a providing unit and a transmitting unit. In accordance with some exemplary embodiments, the providing unit may be operable to carry out at least the providing step of the method according to the ninth aspect of the present disclosure. The transmitting unit may be operable to carry out at least the transmitting step of the method according to the ninth aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
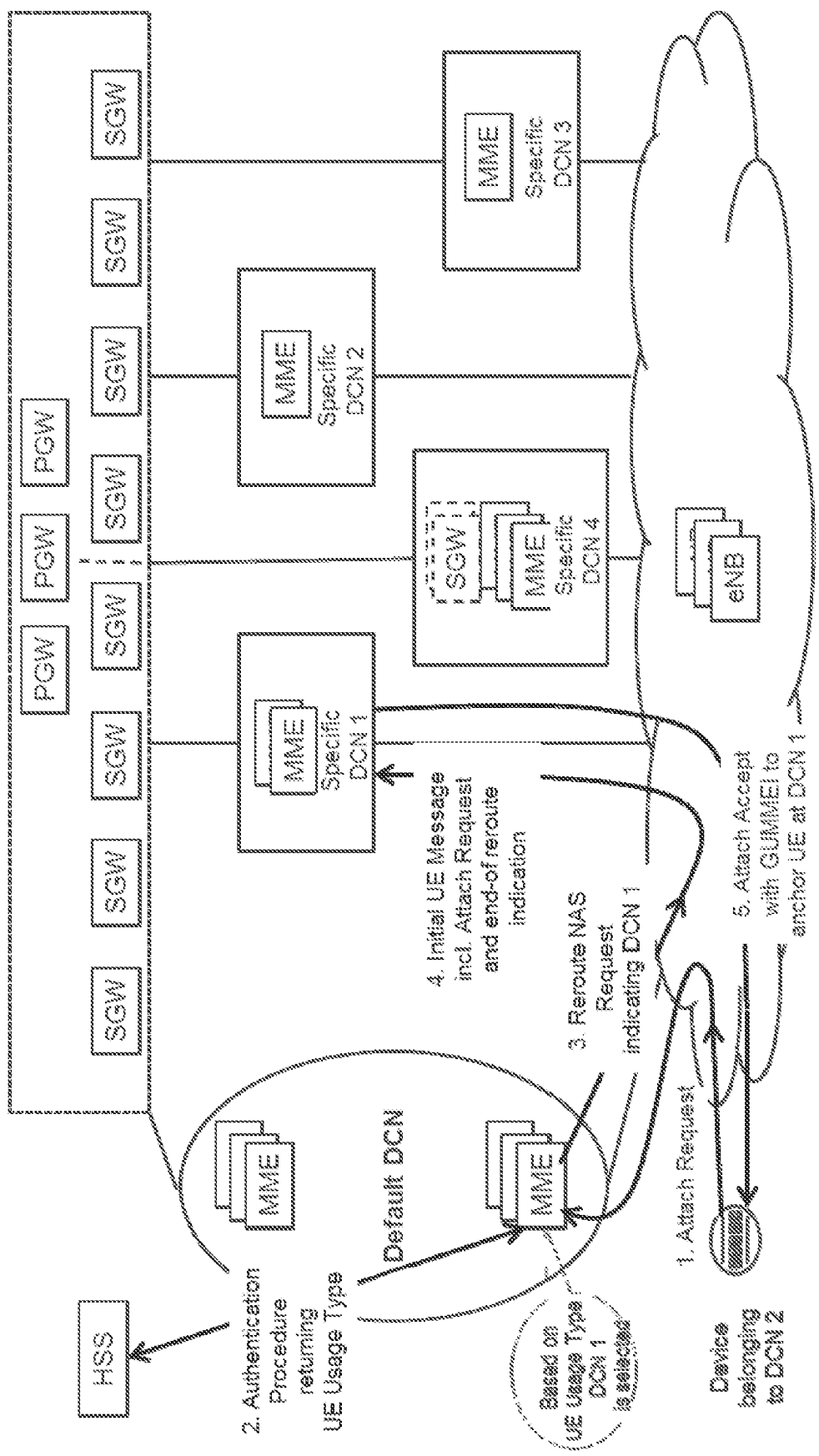
FIG. 1 is a diagram illustrating an exemplary non-access stratum (NAS) redirection procedure according to some embodiments of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. To meet dramatically increasing network requirements on traffic capacity and data rates, one interesting option for communication technique development is to define a dedicated core network (DCN) to provide specific characteristics and/or functions or isolate specific subscribers, for example, cellular Internet of things (CIoT) subscribers, subscribers belonging to a specific enterprise or separate administrative domain, etc. In addition, DCNs also may be deployed for one or more radio access technologies (RATs).

FIG. 1 is a diagram illustrating an exemplary non-access stratum (NAS) redirection procedure according to some embodiments of the present disclosure. For simplicity, FIG. 1 only depicts some exemplary elements such as an end device (e.g., a UE, a mobile station, or other suitable device), evolved NodeBs (eNodeBs or eNBs), a home subscriber server (HSS), mobility management entities (MMEs) respectively in the default DCN and specific DCNs (e.g., DCN 1, DCN 2, DCN 3 and DCN 4), and the corresponding serving gateways (SGWs) and packet data network gateways (PGWs). In practice, a wireless communication system may further include any additional elements suitable to support communication between wireless devices or between a wireless device and another communication device, such as a landline telephone, a service provider, or any other network node or terminal device. The wireless communication system may provide communication and various types of services to one or more wireless devices to facilitate the wireless devices' access to and/or use of the services provided by, or via, the wireless communication system.

The main architecture enhancement illustrated in FIG. 1 is to enable subscribers to be allocated to and served by a DCN based on subscription information of the subscribers. As shown in FIG. 1, the end device belonging to DCN 2 may send an attach request to the MME in the default DCN through a radio access network (RAN) node such as an eNB serving the UE. An authentication procedure between the MME in the default DCN and the HSS of the end device can return the subscription information comprising UUT from the HSS to the MME in the default DCN. Then the MME in the default DCN sends a reroute NAS request to the RAN node. The reroute NAS request may include an MME group identifier (MMEGI) indicating the DCN that corresponds to the UUT received from the HSS. Further, if the end device has a PLMN specific DCN-ID, the end device can provide this DCN-ID and the RAN node can select a specific DCN (such as DCN 1) and a serving MME based on the DCN-ID. Accordingly, the reroute NAS request is sent to the selected MME in DCN 1, for example, by including the attach request in an initial UE message along with an end-of reroute indication. The DCN-ID can be provided to the MME in DCN 1 by the RAN node, together with the reroute NAS request. Then the MME in DCN 1 may send an attach accept message with a globally unique mobility management entity identifier (GUMMEI) to the end device through the RAN node, so as to anchor the end device at DCN 1.

In the network scenario shown in FIG. 1, the DCN is selected for a UE based on UUT information retrieved from the HSS. Since UUT information belongs to subscription information associated with an IMSI of the UE, using UUT information to select the DCN may not be enough for the case that a USIM associated with the IMSI is inserted into different types of terminal devices having different radio capabilities. For example, a mobile broadband (MBB) USIM may be inserted into a Category-M (CAT-M) Internet of things (IoT) device. The Cat-M IoT device needs to be redirected to an IoT DCN, instead of an MBB DCN, due to the Cat-M IoT device having the UE capability with a low bandwidth, high latency communication, and small data transmissions service requirement. Therefore, using UE capabilities plus UUT information may be an attractive solution for DCN selection.

For bandwidth-reduced UEs and low complexity UEs suitable for machine-type communications (MTC), e.g. CAT-M and Category 0 (CAT0) devices, an MME may get UE capabilities in the quite late stage of an attach procedure or an inter-TAU procedure, when the MME explicitly requests the UE capabilities. So the MME may be not able to reroute a CAT-M device to a DCN specific to the corresponding UE capabilities based on the very first attach request message or TAU request message of the CAT-M device. As a consequence, the CAT-M device may be re-routed to an improper DCN in the first attach procedure or inter-TAU procedure only based on UUT of the CAT-M device. After the MME in the improper DCN gets the UE capabilities, a second reroute may be needed to redirect the CAT-M device to a correct DCN. This increases network signaling and the second reroute may not happen immediately. In this case, the CAT-M device may have to stay in the improper DCN for a while.

In order to enhance the resource utilization and improve the network performance, the present disclosure according to some exemplary embodiments proposes to support DCN selection based at least in part on the device category and/or the service type, so that a terminal device can be served by a DCN which is configured to be more suitable for the terminal device in terms of the category and/or capabilities of the terminal device. According to the proposed solution, a network node such as an MME/AMF can get the category of a UE in the very first S1application protocol (S1AP) initial UE message or the first NAS message. In some exemplary embodiments, a new information element (IE) may be introduced in the initial UE message or the NAS message (such as an attach/TAU request) to indicate whether the UE is a bandwidth-reduced UE or a low complexity UE (such as a CAT-M UE). As such, the MME/AMF can select a DCN for the UE based at least in part on the UE category (e.g., Category M1 or Category M2) and/or UUT information.

It is noted that some embodiments of the present disclosure are mainly described in relation to LTE or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 2A:
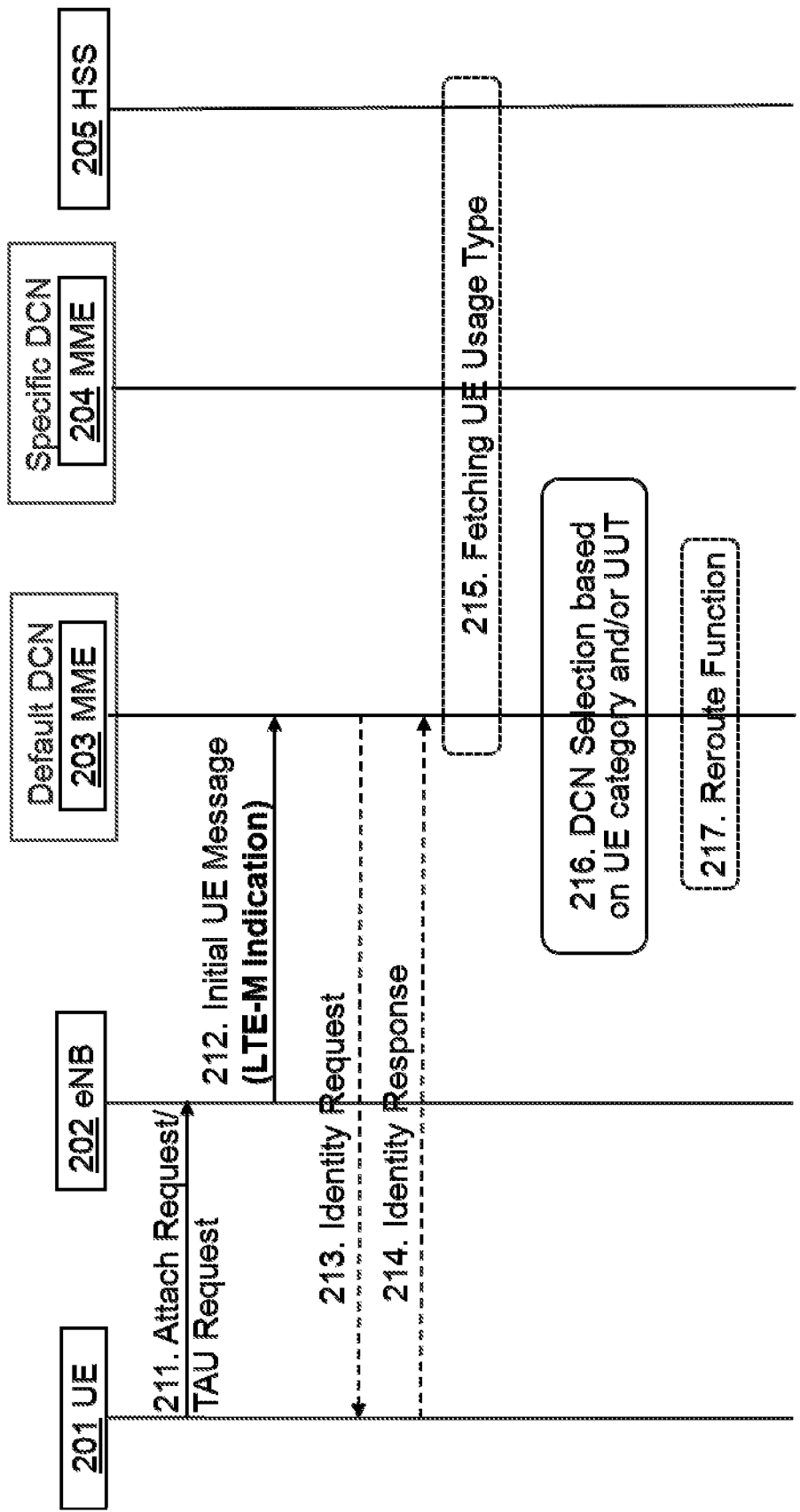
FIGS. 2A-2B are diagrams illustrating two examples of DCN selection according to some embodiments of the present disclosure.
Figure 2B:
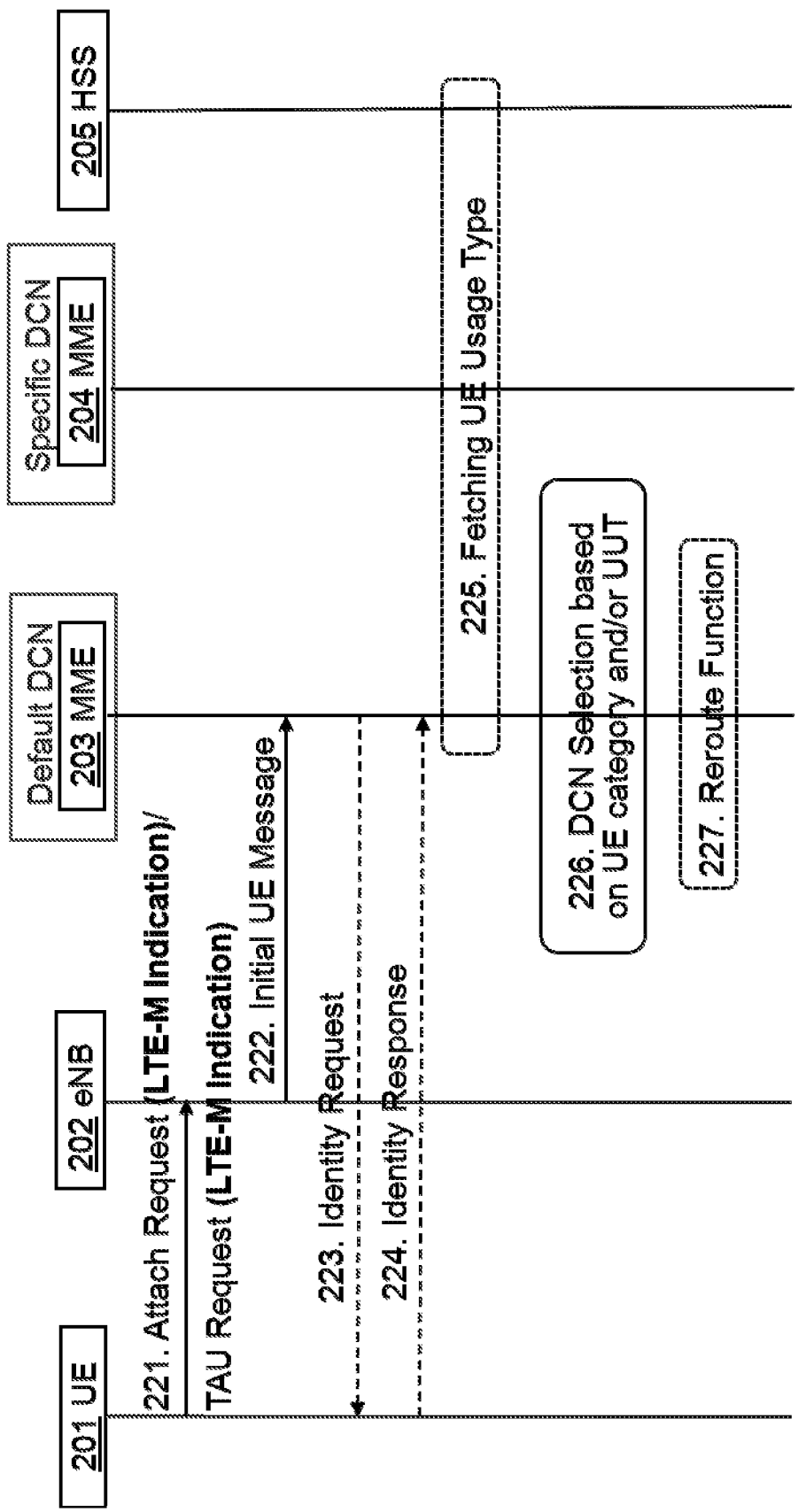

FIGS. 2A-2B are diagrams illustrating two examples of DCN selection according to some embodiments of the present disclosure. For simplicity, FIGS. 2A-2B only depict some exemplary elements such as a UE 201, an eNB 202, an MME 203 in a default DCN, an MME 204 in a specific DCN and an HSS 205. The default DCN mentioned here refers to a DCN to which a first NAS message for the UE 201 is routed through the eNB 202. The specific DCN mentioned here refers to another DCN to which the first NAS message for the UE 201 is rerouted due to the DCN selection based at least in part on UE category. It will be appreciated that signaling messages and network elements shown in FIGS. 2A-2B are just as examples, and more or less alternative signaling messages and network elements may be involved in the DCN selection according to the embodiments of the present disclosure.

In accordance with the exemplary embodiments, there may be two options (e.g., Option I as shown in FIG. 2A and Option II as shown in FIG. 2B) for a MME to get UE category of a device (e.g., CAT-M UE) in the selection of a DCN. In Option I, an eNB serving a UE may include an indicator in an initial UE message to indicate UE category to the MME, since the eNB can determine the UE category in the radio resource control (RRC) connection procedure of the UE. Alternatively, in Option II, the UE may include an indicator in the UE network capability IE in an attach request or a TAU request to indicate the UE category, then the MME can get information about the UE category from the UE network capability IE.

According to the exemplary embodiment described with respect to FIG. 2A, the UE 201 (e.g., a CAT-M UE camping on an evolved-universal terrestrial radio access network (E-UTRAN) cell) may read the master information block (MIB) and related system information broadcast which indicate whether Cat-M is supported in a cell. If the cell supports CAT-M, the UE 201 can access the cell, and send 211 an attach request to the eNB 202. Alternatively, the UE 201 may be already in the evolved packet system mobility management-registered (EMM-REGISTERED) status and can initiate a TAU procedure by sending 211 a TAU request to the eNB 202.

In accordance with the exemplary embodiment, the eNB 202 can determine that a UE is a Category 0 UE based on the logical channel identifier (LCID) for common control channel (CCCH) and the UE capability. Optionally, the eNB can identify category M devices which may be characterized by the radio frequency/base band (RF/BB) bandwidth of 1.4 MHz, a single antenna, and specific physical channels. In the case that the eNB 202 can determine the category of the UE 201, the eNB 202 sends 212 an initial UE message to the MME 203 in the default DCN and uses an LTE-M indication to indicate UE category of the UE 201 (e.g., indicating that the UE 201 is a Cat-M device), as shown in FIG. 2A.

Optionally, the MME 203 in the default DCN may send 213 an identity request to the UE 201, in the event that the UE 201 is unknown to the MME 203. The UE 201 may send 214 an identity response to the MME 203. Through an authentication information retrieval procedure, the MME 203 in the default DCN can fetch 215 some UUT information for the UE 201 from the HSS 205. In accordance with the exemplary embodiment, the MME 203 can select 216 a DCN (such as the specific DCN with which the MME 204 is associated) for the UE 201 based at least in part on the UE category and/or the UUT information of the UE 201, according to certain operation configuration. In response to the selection of the DCN specific to the UE 201, the MME 203 in the default DCN can trigger 217 a reroute function to reroute the NAS request (such as the attach request or the TAU request) of the UE 201 to the selected DCN.

Alternatively, according to the exemplary embodiment described with respect to FIG. 2B, the UE 201 may send 221 an attach/TAU request including an LTE-M indication (for example, in the UE network capability IE) to the eNB 202, when initiating an attach/TAU procedure. In this case, the eNB 202 may not need to identify the category of the UE 201 in the RRC connection procedure. As shown in FIG. 2B, the eNB 202 can send 222 an initial UE message which includes the attach/TAU request initiated by the UE 201 in a NAS packet data unit (PDU), to the MME 203 in the default DCN. As such, the MME 203 can determine the category of the UE 201 according to the LTE-M indication included in the UE network capability IE.

Similar to the situation in FIG. 2A, the MME 203 as shown in FIG. 2B may optionally send 223 an identity request to the UE 201, in the event that the UE 201 is unknown to the MME 203. The UE 201 may send 224 an identity response to the MME 203. Through an authentication information retrieval procedure, the MME 203 in the default DCN can fetch 225 some UUT information for the UE 201 from the HSS 205. In accordance with the exemplary embodiment, the MME 203 can perform the DCN selection 226 for the UE 201 based at least in part on the UE category and/or the UUT information of the UE 201, according to certain operation configuration. In an exemplary embodiment, the DCN associated with the MME 204 may be selected as the specific DCN for the UE 201. The MME 203 in the default DCN can trigger 227 a reroute function to redirect the NAS request (such as the attach/TAU request) of the UE 201 to the selected DCN.

As described previously, the proposed solution according to one or more exemplary embodiments can improve DCN selection by enabling a UE to be served by a DCN based at least in part on the category and/or capabilities of the UE. For example, a first MME (such as the MME 203) to which an attach/TAU request of a UE (such as the UE 201) is initially routed can determine the device category of the UE, according to a UE category indication such as "LTE-M indicator" in an "initial UE message" from a RAN node (such as the eNB 202) serving the UE, as shown in FIG. 2A. Alternatively or additionally, the first MME can determine the device category of the UE, according to a UE category indication such as "LTE-M indicator" in the UE network capability IE of the attach/TAU request initiated by the UE, as shown in FIG. 2B. Based on the determined device category and optionally the UUT of the UE, the first MME can select a specific DCN for the UE and reroute the attach/TAU request of the UE to a second MME in the specific DCN.

Taking advantageous of the proposed solution can optimize DCN selection and enhance network resource utilization. Specific DCNs can be allocated to diverse UEs with different capabilities (for example, CAT-M UEs such as bandwidth-reduced UEs and low complexity UEs defined for MTC) in a more efficient and rational manner. It can be appreciated that although some exemplary embodiments are described with respect to the deployment case where the DCN selection for a UE is performed by a MME, the proposed solution may be equally applicable for other possible deployment cases. For example, the DCN selection according to the proposed solution also may be performed by an AMF in NR/5G network, as well as any other suitable network node in the communication networks.

Figure 3:
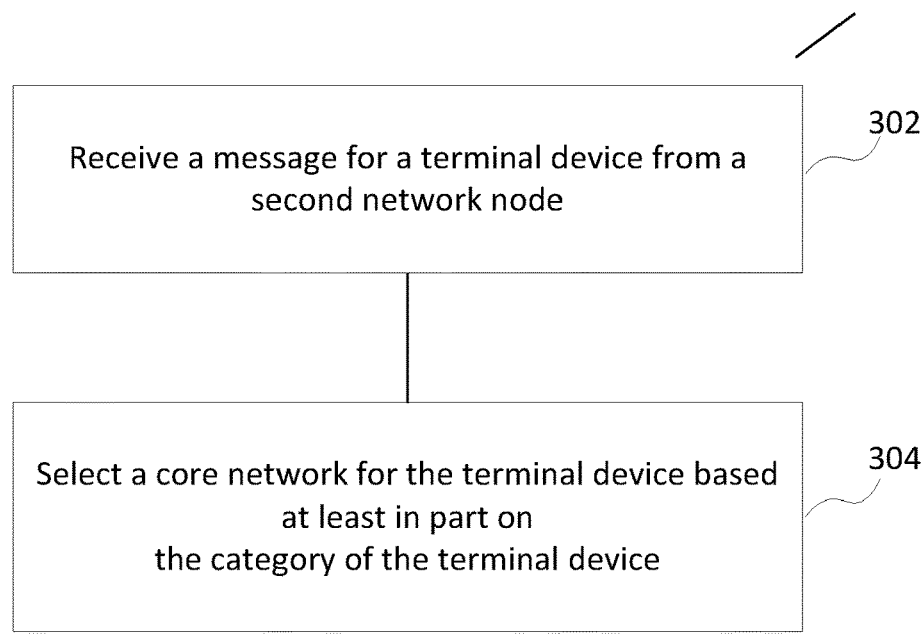
FIG. 3 is a flowchart illustrating a method according to some embodiments of the present disclosure.

FIG. 3 is a flowchart illustrating a method 300 according to some embodiments of the present disclosure. The method 300 illustrated in FIG. 3 may be performed by a first network node or an apparatus communicatively coupled to the first network node. In accordance with an exemplary embodiment, the first network node may comprise a MME (such as the MME 203), an AMF or any other suitable network function or entity which may be able to select a DCN for a terminal device (such as the UE 201).

According to the exemplary method 300 illustrated in FIG. 3, the first network node may receive a message for a terminal device from a second network node, as shown in block 302. The message can enable the first network node to determine a category of the terminal device, such as Category M1, Category M2, etc. In accordance with some exemplary embodiments, the terminal device may comprise a CAT-M UE. The second network node may comprise a node B such as the eNB 202 or a gNB in 5G networks.

In accordance with some exemplary embodiments, the determination of the category of the terminal device by the first network node may be performed according to indication information about the category of the terminal device. In an exemplary embodiment, the category of the terminal device may be indicated by a category indicator which is provided by the second network node in the message for the terminal device. Alternatively or additionally, the category of the terminal device may be indicated by a category indicator which is provided by the terminal device in a communication request carried by the message for the terminal device.

In accordance with some exemplary embodiments, the message for the terminal device may comprise an initial UE message or any other proper message which can indicate the category of the terminal device to the first network node directly or indirectly (e.g., by carrying the communication request which contains the category indicator provisioned by the terminal device). In accordance with some exemplary embodiments, the communication request may comprise one of an attach request and a TAU request for the terminal device, or any other proper request or signaling in which the terminal device can add the category indicator (for example, in the UE network capability IE) to indicate the category of the terminal device.

In accordance with some exemplary embodiments, the first network node can select a core network for the terminal device based at least in part on the category of the terminal device, as shown in block 304. The selected core network may comprise a DCN specific to the terminal device. According to an exemplary embodiment, the selection of the core network for the terminal device based at least in part on the category of the terminal device may comprise selecting the core network for the terminal device, based at least in part on the category of the terminal device and usage type information (such as UUT information) associated with the terminal device.

Figure 4:
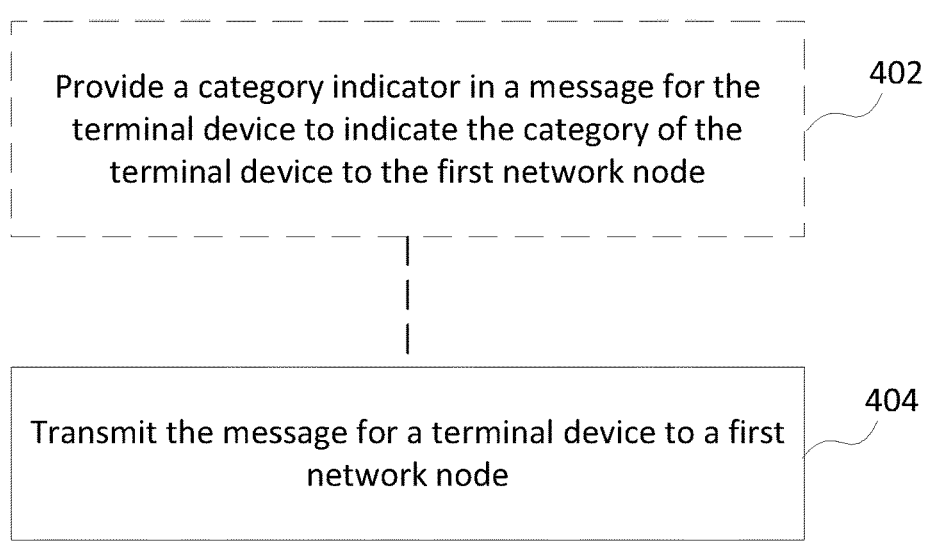
FIG. 4 is a flowchart illustrating another method according to some embodiments of the present disclosure.

FIG. 4 is a flowchart illustrating a method 400 according to some embodiments of the present disclosure. The method 400 illustrated in FIG. 4 may be performed by a second network node or an apparatus communicatively coupled to the second network node. In accordance with an exemplary embodiment, the second network node may comprise an eNB (such as the eNB 202), a gNB, an access point (AP) or any other suitable network device via which a terminal device (such as the UE 201) can access to a communication network and receive services therefrom.

According to the exemplary method 400 illustrated in FIG. 4, the second network node may transmit a message for a terminal device to a first network node, as shown in block 404. The message can enable the first network node (such as an MME/AMF) to select, based at least in part on a category of the terminal device, a core network (such as a specific DCN) for the terminal device. In an exemplary embodiment, the selection of the core network for the terminal device by the first network node may be performed further based on usage type information associated with the terminal device. According to some exemplary embodiments, the message for the terminal device may comprise an initial UE message or any other proper message which can make the first network node be able to determine the category of the terminal device (e.g., a CAT-M UE).

Optionally, the second network node may provide a category indicator in the message for the terminal device to indicate the category of the terminal device to the first network node, as shown in block 402. In this case, the second network node such as the eNB 202 can determine the category of the terminal device, for example, in a random access procedure or a RRC connection procedure, as described with respect to FIG. 2A.

Alternatively or additionally, the message for the terminal device may carry a communication request in which a category indicator is provided by the terminal device to indicate the category of the terminal device. In this case, the second network node may not need to add indication information about the category of the terminal device in the message for the terminal device, but just transparently forwarding the communication request initiated by the terminal device to the first network node. According to some exemplary embodiments, the communication request may comprise an attach request, a TAU request or any other NAS request suitable for indicating the category of the terminal device.

Figure 5:
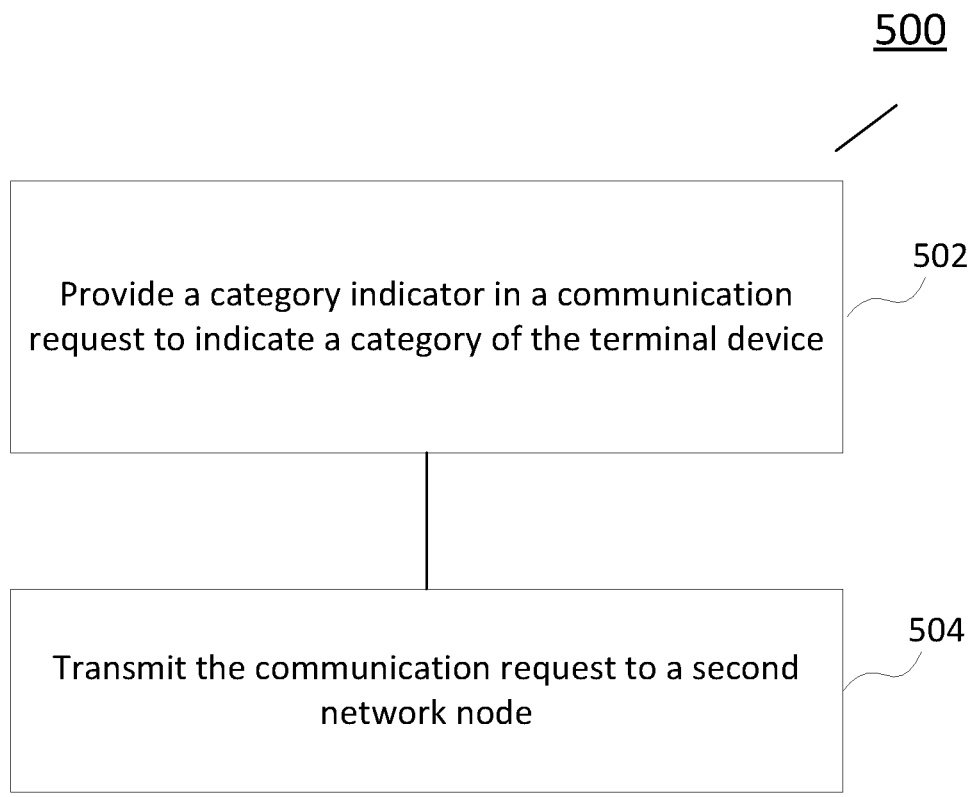
FIG. 5 is a flowchart illustrating yet another method according to some embodiments of the present disclosure.

FIG. 5 is a flowchart illustrating a method 500 according to some embodiments of the present disclosure. The method 500 illustrated in FIG. 5 may be performed by a terminal device or an apparatus communicatively coupled to the terminal device. In accordance with an exemplary embodiment, the terminal device may refer to any radio device that can access a communication network and receive services therefrom. By way of example and not limitation, the terminal device may refer to a mobile terminal, a UE, or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

According to the exemplary method 500 illustrated in FIG. 5, the terminal device can provide a category indicator in a communication request to indicate a category of the terminal device, as shown in block 502. As described in connection with FIGS. 3-4, the communication request may comprise an attach request, a TAU request or any other NAS request which is suitable for indicating the category of the terminal device. In the communication request initiated by the terminal device, the category indicator may be optionally included in an IE about network capability of the terminal device. It can be realized that the network capability of the terminal device may be related to the category of the terminal device (such as a category M1 UE or a category M2 UE).

In accordance with some exemplary embodiments, the terminal device can transmit the communication request to a second network node, as shown in block 504. The communication request is to be carried in a message (such as an initial UE message) transmitted from the second network node (such as an eNB, a gNB, an AP, etc.) to a first network node (such as an MME, an AMF, etc.). The message can enable the first network node to select, based at least in part on the category of the terminal device, a core network (such as a specific DCN) for the terminal device. Optionally, the selection of the core network for the terminal device may be performed by the first network node according to the category of the terminal device and/or usage type information associated with the terminal device.

The proposed solution according to one or more exemplary embodiments can enable a first network node such as MME/AMF to select a DCN for a UE based on device category and/or UUT of the UE. In accordance with some exemplary embodiments, the category of the UE may be indicated to the MME/AMF by a device category indicator provided by the UE or a RAN node such as eNB/gNB serving the UE. As such, specific DCN selection may be provided for various UEs (e.g., bandwidth-reduced UEs and low complexity UEs used for MTCs), so that the UEs can be better maintained in the respective DCNs with more efficient message routing and resource configuration.

The various blocks shown in FIGS. 3-5 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 6:
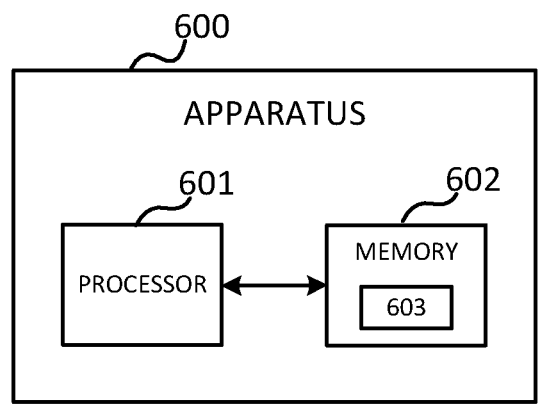
FIG. 6 is a block diagram illustrating an apparatus according to some embodiments of the present disclosure.

FIG. 6 is a block diagram illustrating an apparatus 600 according to various embodiments of the present disclosure. As shown in FIG. 6, the apparatus 600 may comprise one or more processors such as processor 601 and one or more memories such as memory 602 storing computer program codes 603. The memory 602 may be non-transitory machine/processor/computer readable storage medium. In accordance with some exemplary embodiments, the apparatus 600 may be implemented as an integrated circuit chip or module that can be plugged or installed into a first network node as described with respect to FIG. 3, a second network node as described with respect to FIG. 4, and a terminal device as described with respect to FIG. 5.

In some implementations, the one or more memories 602 and the computer program codes 603 may be configured to, with the one or more processors 601, cause the apparatus 600 at least to perform any operation of the method as described in connection with FIG. 3. In some implementations, the one or more memories 602 and the computer program codes 603 may be configured to, with the one or more processors 601, cause the apparatus 600 at least to perform any operation of the method as described in connection with FIG. 4. In some implementations, the one or more memories 602 and the computer program codes 603 may be configured to, with the one or more processors 601, cause the apparatus 600 at least to perform any operation of the method as described in connection with FIG. 5.

Alternatively or additionally, the one or more memories 602 and the computer program codes 603 may be configured to, with the one or more processors 601, cause the apparatus 600 at least to perform more or less operations to implement the proposed methods according to the exemplary embodiments of the present disclosure.

Figure 7:
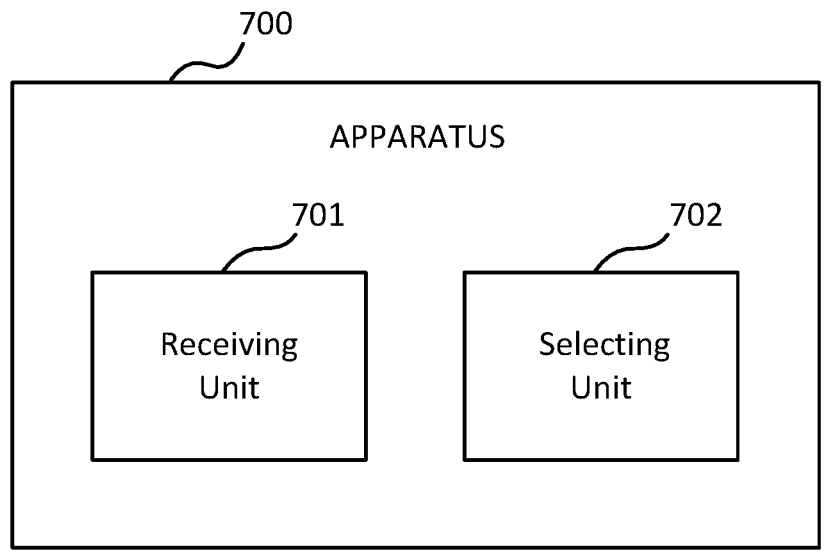
FIG. 7 is a block diagram illustrating another apparatus according to some embodiments of the present disclosure.

FIG. 7 is a block diagram illustrating an apparatus 700 according to some embodiments of the present disclosure. The apparatus 700 may be implemented as a first network node or as a part of the first network node. As shown in FIG. 7, the apparatus 700 may comprise a receiving unit 701 and a selecting unit 702. In an exemplary embodiment, the apparatus 700 may be implemented in a first network node such as an MME or an AMF. The receiving unit 701 may be operable to carry out the operation in block 302, and the selecting unit 702 may be operable to carry out the operation in block 304. Optionally, the receiving unit 701 and/or the selecting unit 702 may be operable to carry out more or less operations to implement the proposed methods according to the exemplary embodiments of the present disclosure.

Figure 8:
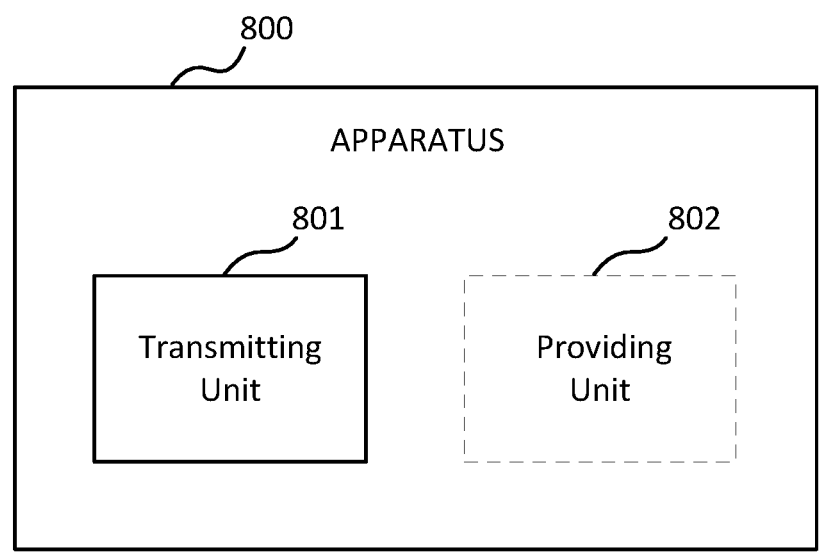
FIG. 8 is a block diagram illustrating yet another apparatus according to some embodiments of the present disclosure.

FIG. 8 is a block diagram illustrating an apparatus 800 according to some embodiments of the present disclosure. The apparatus 800 may be implemented as a second network node or as a part of the second network node. As shown in FIG. 8, the apparatus 800 may comprise a transmitting unit 801 and optionally a providing unit 802. In an exemplary embodiment, the apparatus 800 may be implemented in a second network node such as an eNB or a gNB. The transmitting unit 801 may be operable to carry out the operation in block 404, and the providing unit 802 may be operable to carry out the optional operation in block 402. Optionally, the transmitting unit 801 and/or the providing unit 802 may be operable to carry out more or less operations to implement the proposed methods according to the exemplary embodiments of the present disclosure.

Figure 9:
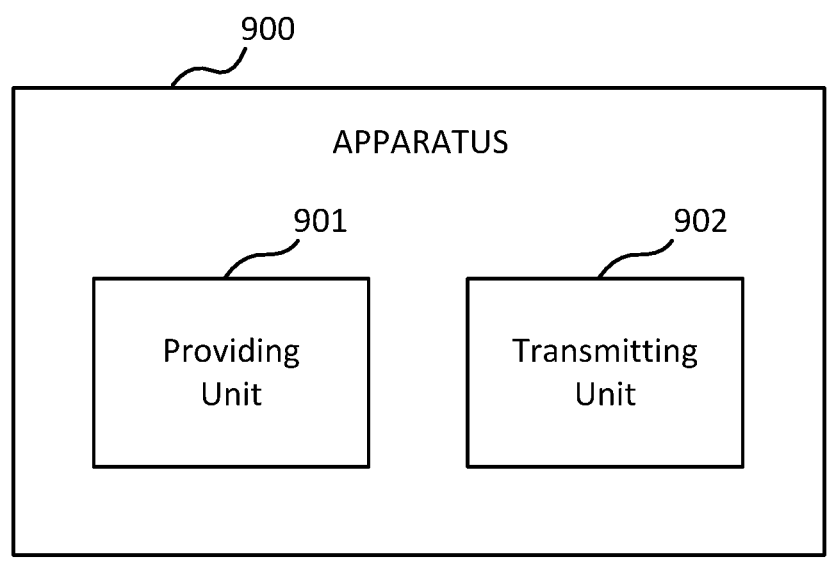
FIG. 9 is a block diagram illustrating a further apparatus according to some embodiments of the present disclosure.

FIG. 9 is a block diagram illustrating an apparatus 900 according to some embodiments of the present disclosure. The apparatus 900 may be implemented as a terminal device or as a part of the terminal device. As shown in FIG. 9, the apparatus 900 may comprise a providing unit 901 and a transmitting unit 902. In an exemplary embodiment, the apparatus 900 may be implemented in a terminal device such as UE. The providing unit 901 may be operable to carry out the operation in block 502, and the transmitting unit 902 may be operable to carry out the operation in block 504. Optionally, the providing unit 901 and/or the transmitting unit 902 may be operable to carry out more or less operations to implement the proposed methods according to the exemplary embodiments of the present disclosure.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a first network node, wherein the first network node is a mobility management entity (MME) or an access and mobility management function (AMF), the method comprising:
   receiving an initial message for a user equipment (UE) from a second network node, wherein the second network node is a radio access network (RAN) node and wherein the second network node transmits the initial message to the first network node to indicate that the UE is a category M device, based on a radio resource control (RRC) message from the UE indicating that the UE is a category M device, wherein the category M of the UE is indicated by a long term evolution (LTE)-M indication for evolved-universal terrestrial radio access (E-UTRA); and
   determining that the UE is a category M device based on the initial message,
      wherein a category M of the UE is used for selecting a dedicated core network (DCN) for the UE as a category M device.

2. The method according to claim 1, wherein the second network node comprises a node B.

3. A method performed by a second network node, wherein the second network node is a radio access network (RAN) node, the method comprising:
   receiving a radio resource control (RRC) message from a user equipment (UE) indicating that the UE is a category M device, wherein the category M of the UE is indicated by a long term evolution (LTE)-M indication for evolved-universal terrestrial radio access (E-UTRA); and
   transmitting an initial message to a first network node based on the RRC message, wherein the initial message indicates that the UE is the category M device and for the first network node to use the category M of the UE to select a dedicated core network (DCN) for the UE as a category M device, and wherein the first network node is a mobility management entity (MME) or an access and mobility management function (AMF).

4. The method according to claim 3, wherein the second network node comprises a node B.

5. A method performed by a user equipment (UE) comprising:
   generating a radio resource control (RRC) message indicating that the UE is a category M device, wherein the category M of the UE is indicated by a long term evolution (LTE)-M indication for evolved-universal terrestrial radio access (E-UTRA); and
   transmitting the RRC message to a second network node, which second network node is a radio access network (RAN) node, to facilitate an initial message to be transmitted from the second network node to a first network node, which first network node is a mobility management entity (MME) or an access and mobility management function (AMF), wherein the initial message indicates that the UE is a category M device and for the first network node to use a category M of the UE to select a dedicated core network (DCN) for the UE as a category M device.

6. The method according to claim 5, wherein a category indicator is included in an information element about network capability of the UE.

7. The method according to claim 5, wherein the second network node comprises a node B.

8. A first network node, which node is a mobility management entity (MME) or an access and mobility management function (AMF), comprising:
   one or more processors; and
   one or more memories comprising computer program codes which, when executed by the one or more processors, cause the first network node to:
      receive an initial message for a user equipment (UE) from a second network node, wherein the second network node is a radio access network (RAN) node and wherein the second network node transmits the initial message to the first network node to indicate that the UE is a category M device, based on a radio resource control (RRC) message from the UE indicating that the UE is a category M device, wherein the category M of the UE is indicated by a long term evolution (LTE)-M indication for evolved-universal terrestrial radio access (E-UTRA) ; and
      determine that the UE is the category M device based on the initial message, wherein a category M of the UE is used to select a dedicated core network (DCN) for the UE as a category M device.

9. A second network node, which node is a radio access network (RAN) node, comprising:
   one or more processors; and
   one or more memories comprising computer program codes which, when
      executed by the one or more processors, cause the second network node to:
         receive a radio resource control (RRC) message from a user equipment
         (UE) indicating that the UE is a category M device, wherein the category M of the UE is indicated by a long term evolution (LTE)-M indication for evolved-universal terrestrial radio access (E-UTRA); and
         transmit an initial message to a first network node based on the RRC message, wherein the initial message indicates that the UE is a category M device and for the first network node to use a category M of the UE to select a dedicated core network (DCN) for the UE as a category M device, and wherein the first network node is a mobility management entity (MME) or an access and mobility management function (AMF).

10. A user equipment (UE) comprising:
   one or more processors; and
   one or more memories comprising computer program codes which, when executed by the one or more processors, cause the UE to:
   generate a radio resource control (RRC) message indicating that the UE is a category M device, wherein the category M of the UE is indicated by a long term evolution (LTE)-M indication for evolved-universal terrestrial radio access (E-UTRA); and
   transmit the RRC message to a second network node, which second network node is a radio access network (RAN) node, to facilitate an initial message to be transmitted from the second network node to a first network node, which first network node is a mobility management entity (MME) or an access and mobility management function (AMF), wherein the initial message indicates that the UE is a category M device and for the first network node to use a category M of the UE to select a dedicated core network (DCN) for the UE as a category M device.

\* \* \* \* \*